United States Patent [19]
Dombroski

[11] Patent Number: 5,329,278
[45] Date of Patent: Jul. 12, 1994

[54] PIVOTING ELECTRONIC KEYBOARD KEYS

[76] Inventor: Michael L. Dombroski, 321 N. Lincoln St., Bay City, Mich. 48708

[21] Appl. No.: 782,064

[22] Filed: Oct. 24, 1991

[51] Int. Cl.$^5$ ............................................. H01H 23/00
[52] U.S. Cl. ....................................... 341/20; 341/22; 341/34; 200/339; 200/517; 200/553
[58] Field of Search ........................ 341/20, 21, 22, 34; 200/277.1, 302.3, 315, 339, 517, 525, 553, 556, 559, 5 B, 5 E, 5 A, 5 R, 6 A, 6 R, 335, 314, 520; 400/485, 486, 488, 496

[56] References Cited

U.S. PATENT DOCUMENTS

| | | | |
|---|---|---|---|
| 3,691,324 | 9/1972 | Brantingson | 200/5 A |
| 4,311,884 | 1/1982 | Henley et al. | 200/339 |
| 4,440,515 | 4/1984 | Nassimbene | 341/22 |
| 4,843,200 | 6/1989 | Parlatore et al. | 200/339 |
| 4,918,264 | 4/1990 | Yamamoto et al. | 200/517 |
| 5,053,591 | 10/1991 | Theurer | 200/302.3 |
| 5,140,235 | 8/1992 | Ahmed et al. | 200/5 R |

OTHER PUBLICATIONS

"Compact computer keyboard" article from IBM Technical Disclosure Bulletin vol. 27, No. 10A, Mar. 1985, pp. 5640-5642.

Primary Examiner—Donald J. Yusko
Assistant Examiner—John Giust
Attorney, Agent, or Firm—Learman & McCulloch

[57] ABSTRACT

A computer keyboard includes a plurality of pairs of side by side keys, each pair of which is on opposite sides of a vertical plane lying between such keys. The keys are mounted for pivotal movement about respective first and second axes. The first key is located at one side of the plane and its pivotal axis is on the opposite side of such plane. The second key is located on the same side of the plane as the first axis and has its pivotal axis on the same side of the plane as the first key. The spacing between the axes is such that the keys have maximum vertical travel and minimal lateral travel. The keys have faces that are inclined toward the plane to form an upwardly concave pocket between the keys for the accommodation of a user's finger. A switch is activated by the first key and another switch is activated by the second key.

15 Claims, 2 Drawing Sheets

PIVOTING ELECTRONIC KEYBOARD KEYS

TECHNICAL FIELD

The invention relates to keys for an electronic keyboard and more particularly to keys for an electronic keyboard to be operated by one hand.

BACKGROUND OF THE INVENTION

Standard electronic keyboards for computers are operated by both hands. These keyboards are too large and cumbersome for use with miniaturized hand held computers and computer terminals. Small keyboards have been developed for use with hand held computers and computer terminals. Many of these terminals are designed to be operated by the index finger of one hand. Operation by one finger is relatively slow. The large number of keys to be operated by one finger generally requires visual observation of the keyboard in order to direct the finger to the proper keys.

Keyboards designed to be operated by the thumb and four fingers of one hand have been designed to provide increased speed and to allow manipulation of the keys without visual reference to the keyboard. These keyboards are only marginally successful. It can be difficult to locate and press one key at a time. Rocker type switches, which have been used to assist the finger in locating the keys, move sideways as well as vertically. The movement to the side and the relatively short vertical movement provide poor tactile response to the fingers and slows operation.

SUMMARY OF THE INVENTION

An object of the invention is to provide a pivoted key for a keyboard with adequate vertical travel and minimal lateral travel.

Another object of the invention is to provide two side by side keys for a keyboard with adequate vertical travel and minimal lateral travel.

A further object of the invention is to provide two side by side keys for a keyboard with key face surfaces that slant toward each other.

A pair of keys for an electronic keyboard are arranged side by side to be operated by one finger. The keyboard includes a face board and a face plate which form a mounting plate. A printed circuit board and conductive collapsible rubber dome switches are mounted below the mounting plate.

First and second pivot pins with parallel spaced apart fore and aft axes are mounted on the face board adjacent to the face plate. A first key with a body portion and a key face surface is pivotally connected to the first pivot pin and has its key face surface above the face plate and to one side of the axis of the first pivot pin. A second key with a body portion and a key face surface is pivotally connected to the second pivot pin and has its face surface above the face plate and to one side of the axis of the second pivot pin. The axis of the first pivot pin underlies the second key and the axis of the second pivot pin underlies the first key. Electronic switch actuator surfaces on the first and second key body portions contact adjacent conductive collapsible rubber dome switches on a printed circuit board when the face surfaces are depressed.

The foregoing and other objects, features and advantages of the invention will become apparent in light of the following detailed description of exemplary embodiments thereof, as illustrated in the accompanying drawing.

DETAILED DESCRIPTION OF THE INVENTION

Figure 1:
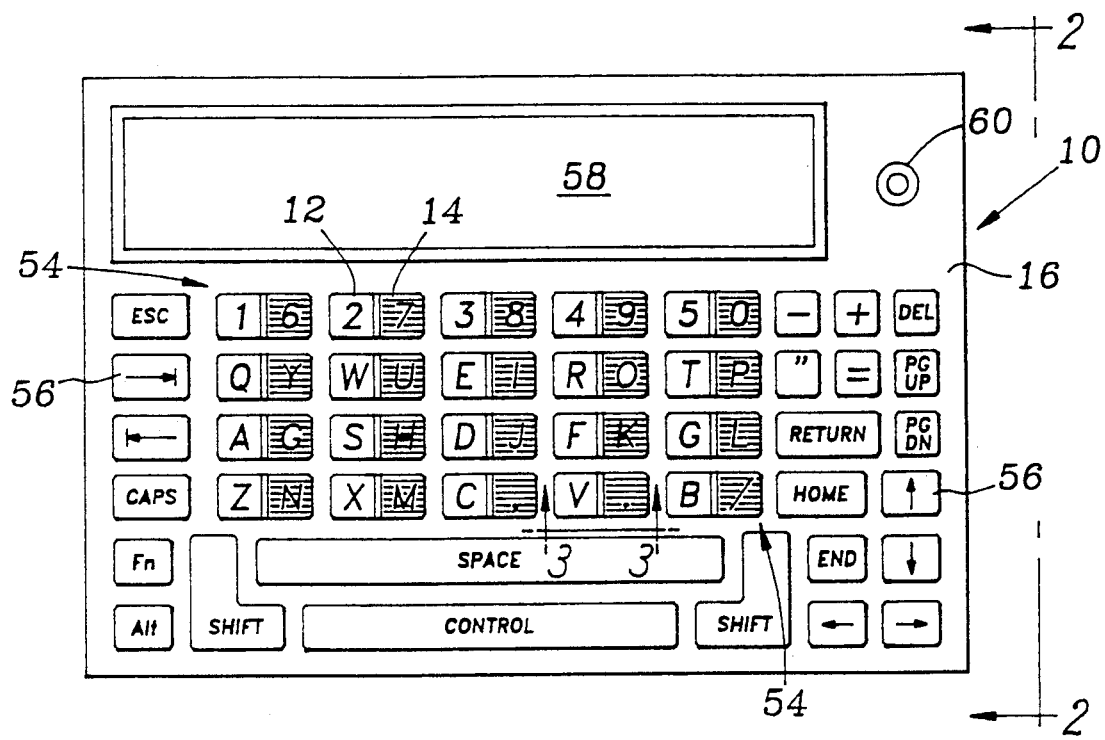
FIG. 1 is a full scale top view of a complete keyboard incorporating twenty pairs of the side by side keys arranged in columns and rows.

A portion of a computer keyboard 10, with a plurality of first or left hand keys 12 and a plurality of second or right hand keys 14, is shown in FIG. 1. The first and second keys 12 and 14 of each pair are positioned side by side so that they can be bridged and operated by one finger with minimal lateral finger movement. The first and second keys are supported on a mounting frame including a face plate 16 having an opening through which the keys project.

Figure 2:
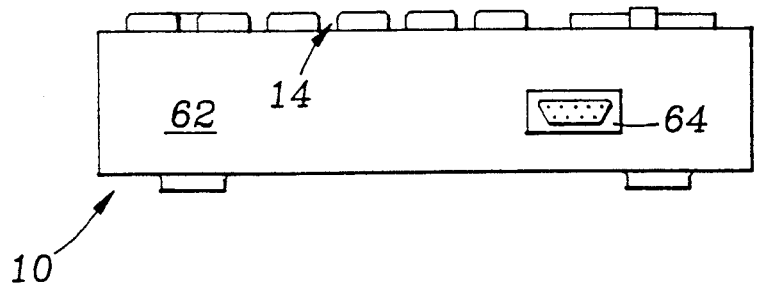
FIG. 2 is a side elevation of the complete keyboard taken along line 2—2 in FIG. 1.
Figure 3:
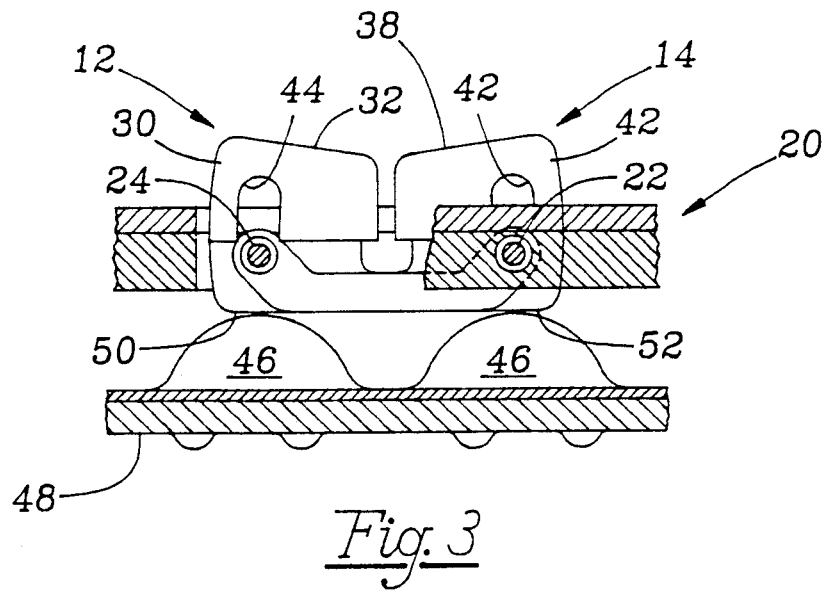
FIG. 3 is an enlarged end view of one pair of side by side keys with parts broken away taken along line 3—3 in FIG. 1.
Figure 4:
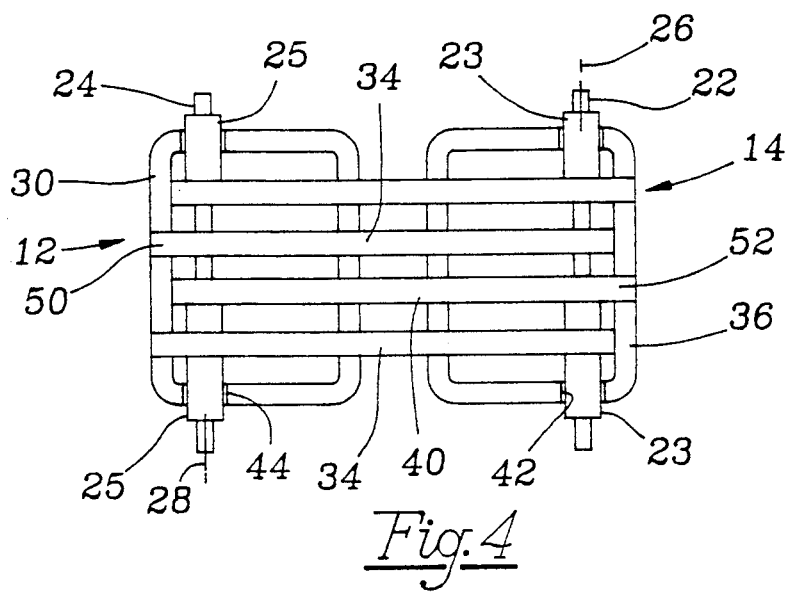
FIG. 4 is a bottom view of a pair of keys and pivot pins taken along line 4—4 in FIG. 3.

The face plate 16 is attached to a face board 18 (FIG. 3). The face plate 16 and the face board 18 together form a mounting plate 20, a portion of which is shown in FIG. 2. The face plate 16 and the face board 18 could be one part rather than multiple parts if desired. A first pivot pin 22 is mounted in a recess in the face board 18. A second pivot pin 24 is also mounted in a recess in the face board 18. The first and second pivot pins 22 and 24 have parallel spaced apart axes 26 and 28 (FIG. 4). Both the first and the second pivot pins 22 and 24 are positioned adjacent to the face plate 16 to position the first and second pivot pin axes 26 and 28 as high as possible.

Each first key 12 includes a body portion 30 and a key face surface 32 (FIG. 3). The body portion 30 is pivotally attached to the first pivot pin 22 by arm members 34 (FIG. 4) which extend laterally to one side of the key face surface 32. Each second key 14 includes a body portion 36 and a key face surface 38. The body portion 36 is pivotally attached to the second pivot pin 24 by arm members 40 which extend laterally to one side of the key face surface 38. The arm members 34 are integral parts of the body portion 30 and extend under the key face surface 38 of the companion second key 14. The arm members 40 are integral parts of the body portion 36 and extend under the key face surface 32 of the companion first key 12. The arm members are maintained in position on the respective pins 22 and 24 by spacers 23 and 25 (FIG. 4).

Figure 5:
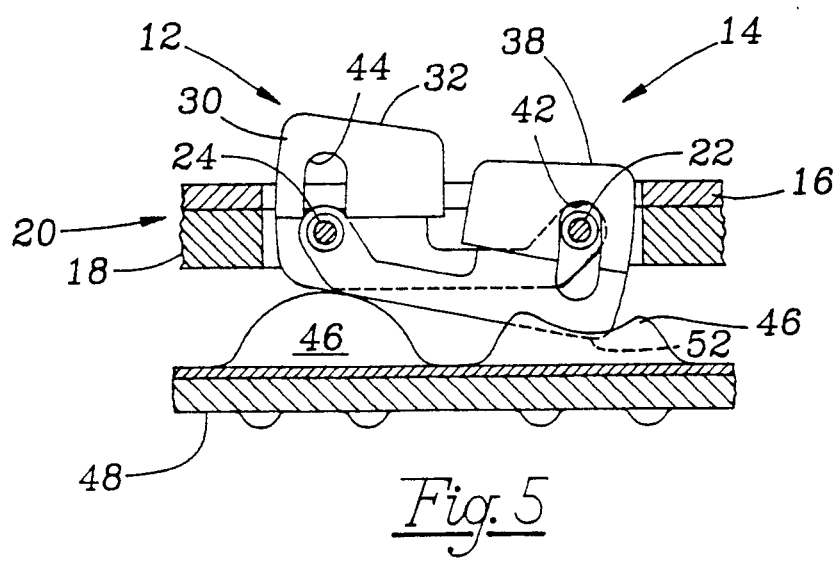
FIG. 5 is an end view similar to FIG. 2 with one key depressed.

The first pivot pin 22 passes through an aperture 42 in the second key 14 as shown in FIGS. 3 and 5 of the drawing. The second pivot pin 24 passes through an aperture 44 in the first key 12. The first and second pivot pins 22 and 24 in this location cooperate with the apertures 42 and 44 to act as stops and limit movement of the first and second keys 12 and 14 about the axes 26 and 28.

It is not essential, of course, that the pins 22 and 24 extend through all of the respective keys. Each key may be mounted for rotation about an individual axis, if desired, by any conventional, suitable pivot means.

The axes 26 and 28 of the first and second pivot pins 22 and 24 are spaced apart and located on opposite sides of a vertical plane P (FIG. 3) lying between the adjacent pair of keys 12 and 14. The axis 22 of the first key 12 underlies the second key 14 and the axis 24 of the second key 14 underlies the first key 12. This arrangement enables the keys to move vertically as much as possible and laterally as little as possible. The placement of the axes 26 and 28 of the first and second pivot pins 22 and 24 close to the face plate 16 also reduces lateral movement of the key face surfaces 32 and 38. However, if the first and second pivot pin axes 26 and 28 are spaced apart more than twice the width of each key face surface 32 and 38, the first and second pivot pins 22 and 24 will not cooperate with the apertures 42 and 44 to act as stops for the keys 12 and 14, and the first and second pivot pins 22 and 24 may also interfere with adjacent pairs of keys. If there is lateral space available, it would improve functioning of the first and second keys 12 and 14 to space the axes 26 and 28 apart more than twice the width of each key face surface 32 and 38.

A conventional, collapsible, resilient dome switch 46 (FIGS. 3 and 5) is mounted on a printed circuit board 48 below each key 12 and 14. The contact surfaces 50 and 52 on the body portions 30 and 36 of the first and second keys 12 and 14 contact an adjacent conventional, collapsible, resilient dome switch 46 to activate the switches when the first or second key 12 or 14 is depressed. As shown in FIG. 5, the second key 14 is depressed and the contact surface 52 has deformed one of the collapsible dome switches 46. The resilience of the switch can return the second key 14 to its starting position when pressure is removed from the key face surface 38 on the second key 14. Movement of the switch 46 toward the axis 28 will reduce the pressure required on the key face surface 32 to activate the switch 46. Movement of the switch 46 away from the axis 28 will increase the pressure required on the key face surface 32 to activate the switch 46. However, such movement of the switch 46 may also change the vertical distance the key face surface 32 moves. Springs can be provided to lift the first and second keys 12 and 14 if needed. The dome switches 46 are illustrative only; other kinds of conventional, depressible, resilient switches can be used.

The key face surfaces 32 and 38 on the side by side pairs of keys 12 and 14 slant or converge toward each other. As shown in FIG. 3, the key face surfaces 32 and 38 form an upwardly concave pocket for a finger. This pocket locates a finger and allows the operator to depress the first key 12 or the second key 14 by rolling the finger in the pocket toward one key or the other key. The operator can also depress the first key 12 or the second key 14 by moving a finger laterally toward the key to be depressed or by pressing down on the high portion of the key. When one key is depressed, as the second key 14 is in the position shown in FIG. 5, the key face surface 38 moves toward a position parallel to the face plate 16. The inclination of key faces is such that, when two keys are depressed simultaneously, the face surfaces are substantially co-planar.

The keyboard 10 as shown in FIG. 1 includes a plurality, such as twenty, sets of side by side keys 54 arranged in row and columns and a plurality of single keys 56. As shown in FIG. 1 the keyboard 10 has a power switch 60 and a liquid crystal display 58 mounted on the mounting plate 20 and surrounded by the face plate 16. The mounting plate 20 is secured to the upper portion of side walls 62 one of which is shown in FIG. 2. The printed circuit board 48 is secured to the lower portion of side walls 62 in a position below and parallel to the face plate 16. Suitable connectors 64 are mounted on the side walls 62 to connect the keyboard 10 to a computer, a power source, or other desired equipment.

The sets of side by side keys 54 as shown in FIG. 5 are arranged so that the first or left hand keys 12 correspond to the keys operated by the fingers of the left hand on many typewriters and standard computer keyboards. The second or right hand keys 14 of the side by side keys 54 correspond to the keys operated by the fingers of the right hand on many typewriters and standard computer keyboards. This arrangement of the keys is one of many that can be used. However, this arrangement of the keys allows operation by either the left or right hand and in either case, half the character locations are already known by most keyboard operators. If desired, the keys adapted to be operated by the right hand for a conventional keyboard can be colored or shaded, as shown in FIG. 1, differently from the keys adapted to be operated by the left hand.

The side by side keys 12 and 14 have been shown in combination with conductive, collapsible, dome switches 46. The keys 12 and 14 could also be used in combination with mechanical switches, capacitive switches, or membrane switches. All four types of switches are commonly found in electronic keyboards for computers and computer terminals. The side by side keys 12 and 14 can easily be adapted to activate any one of the four types of switches as well as other switches.

The sets of side by side keys 54 have been described and shown in the drawing in one specific arrangement. The sets of side by side keys 54 can be placed or employed in many different arrangements without departing from the invention.

The disclosed embodiment is representative of the preferred form of the invention, but is intended to be illustrative rather than definitive thereof. The invention is defined in the claims.

What I claim is:

1. A key assembly for a keyboard or the like comprising a first key; a second key spaced from and adjacent said first key, said first and second keys occupying positions on opposite sides of a plane passing between said first and second keys, said first and second keys being sufficiently close to one another as to be bridged by a single finger of a person's hand; means mounting said first key for rocking movements between first and second positions and independently of said second key about a first axis underlying said second key; means mounting said second key for rocking movements between first and second positions and independently of said first key about a second axis underlying said first key; first operating means responsive to rocking movements of said first key; and second operating means responsive to rocking movements of said second key.

2. The assembly according to claim 1 wherein each of said key has a finger-engaging surface, each of said surfaces being inclined to form a concave pocket when the respective keys are in their said first position.

3. The assembly according to claim 2 wherein the inclination of each of said surfaces is such that when the respective keys are in their said second position said surfaces are substantially coplanar.

4. The assembly according to claim 1 wherein each of said keys has a body portion having an aperture therein, the mounting means for said first key passing through the aperture in the body portion of said second key and the mounting means for said second key passing through the aperture in the body portion of said first key.

5. The assembly according to claim 4 wherein the mounting means for said first key comprises a first pivot pin and the mounting means for said second key comprises a second pivot pin.

6. The assembly according to claim 4 wherein the body portion at opposite ends of the respective aperture limits rocking movements of the respective keys beyond said first and second positions.

7. A key assembly for a keyboard or the like comprising a first key; a second key spaced from and adjacent said first key, said first and second keys occupying positions on opposite sides of a plane passing between said first and second keys, said first and second keys being sufficiently close to one another as to be bridged by a single finger of a person's hand; means mounting said first key for rocking movements between inactive and active positions and independently of said second key about a first axis located on that side of said plane opposite the side of said plane occupied by said first key; means mounting said second key for rocking movements between inactive and active positions and independently of said first key about a second axis located on that side of said plane opposite the side occupied by said second key; first switching means operable in response to rocking movement in one direction of said first key from its said inactive position; and second switching means operable in response to rocking movement of said second key in one direction from its said inactive position.

8. The assembly according to claim 7 wherein said first axis underlies said second key and said second axis underlies said first key.

9. The assembly according to claim 7 wherein said first switching means biases said first key to its said inactive position and said second switching means biases said second key to its said inactive position.

10. The assembly set forth in claim 7 wherein said first key has a body portion having an aperture therein, said second key has a body portion having an aperture therein, said first axis extending through the aperture in said body portion of said second key, and said second axis extending through the aperture in said body portion of said first key.

11. The assembly according to claim 10 wherein said first axis is defined by a first pivot pin and said second axis is defined by a second pivot pin.

12. The assembly according to claim 11 wherein the aperture in the body portion of said second key is of such length as to limit rocking movements of said second key about said second axis and the aperture in the body portion of said first key is of such length as to limit rocking movements of said first key about said second axis.

13. A key assembly for a keyboard comprising first and second spaced apart, independent keys; means mounting said keys for independent rocking movements about parallel axes on opposite sides of a plane passing between said keys, the axis of rocking movement of said first key being on that side of said plane on which said second key lies and the axis of rocking movement of said second key being on that side of said plane on which said first key lies; operating means carried by said first key; and operating means carried by said second key.

14. The assembly according to claim 13 wherein the axis of rocking movement of said first key underlies said second key and the axis of rocking movement of said second key underlies said first key.

15. The assembly according to claim 13 wherein said mounting means has a substantially planar surface through which said keys project, each of said first and second keys having a finger-engaging surface that is inclined toward said surface in a direction toward said plane, thereby enabling the finger-engaging surfaces of said first and second keys to form an upwardly concave pocket for accommodating a finger of a person.

* * * * *